United States Patent
Nagashima et al.

(10) Patent No.: US 9,891,376 B2
(45) Date of Patent: Feb. 13, 2018

(54) OPTICAL FIBER

(71) Applicant: SUMITOMO ELECTRIC INDUSTRIES, LTD., Osaka-shi, Osaka (JP)

(72) Inventors: Takuji Nagashima, Yokohama (JP); Tetsuya Hayashi, Yokohama (JP); Tetsuya Nakanishi, Yokohama (JP); Takashi Sasaki, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/135,656

(22) Filed: Apr. 22, 2016

(65) Prior Publication Data

US 2016/0238783 A1 Aug. 18, 2016

Related U.S. Application Data

(63) Continuation of application No. PCT/JP2015/073618, filed on Aug. 21, 2015.

(30) Foreign Application Priority Data

Aug. 22, 2014 (JP) .................................. 2014-169170

(51) Int. Cl.
*G02B 6/02* (2006.01)

(52) U.S. Cl.
CPC ..... *G02B 6/02042* (2013.01); *G02B 6/02395* (2013.01)

(58) Field of Classification Search
CPC .. G02B 6/02042; G02B 6/02395; G02B 6/44; G02B 6/02
See application file for complete search history.

(56) References Cited

U.S. PATENT DOCUMENTS

| 6,343,172 B1 * | 1/2002 | Schiestle ............. G02B 6/4416 385/101 |
| 8,335,421 B2 * | 12/2012 | Imamura ............ G02B 6/02042 385/125 |
| 9,423,559 B2 * | 8/2016 | Tsuchida ............. H01S 3/06737 |
| 2014/0003779 A1 | 1/2014 | Arakawa et al. |
| 2015/0055923 A1 | 2/2015 | Saito et al. |

FOREIGN PATENT DOCUMENTS

| FR | 2684454 | 6/1993 |
| JP | H1-279210 | 11/1989 |
| JP | 2002-525645 A | 8/2002 |
| JP | 2010-055028 A | 3/2010 |

(Continued)

*Primary Examiner* — Ryan Lepisto
(74) *Attorney, Agent, or Firm* — Drinker Biddle & Reath LLP (57) ABSTRACT

An embodiment of the invention enables each core in an end face to be readily identified by observation of either one end face, regardless of the presence or absence of a twist of a pertinent MCF and difference of ends. In a cross section of the MCF, a core group constellation has symmetry but each core in a core group is identifiable by breaking of all types of symmetry in a common cladding, defined by a combination of the core group constellation with the common cladding, or, by making the fiber ends distinguishable.

14 Claims, 11 Drawing Sheets

(56) References Cited

FOREIGN PATENT DOCUMENTS

| JP | 2013-231915 | 11/2013 |
|----|-------------|---------|
| JP | 2014-052410 A | 3/2014 |
| WO | WO-00/016131 A2 | 3/2000 |
| WO | WO-2012/172996 A1 | 12/2012 |
| WO | WO 2013/128730 | 9/2013 |
| WO | WO-2014/109395 A1 | 7/2014 |

* cited by examiner

OPTICAL FIBER

CROSS-REFERENCE TO RELATED APPLICATIONS

This application is a continuation application of PCT/JP2015/073618 claiming the benefit of priority of the Japanese Patent Application No. 2014-169170 filed on Aug. 22, 2014, the entire contents of which are incorporated herein by reference.

TECHNICAL FIELD

The present invention relates to an optical fiber and, more particularly, to a multicore optical fiber (hereinafter referred to as "MCF") having a plurality of identifiable cores extending along a fiber axis and a common cladding surrounding the cores, and a core identifying method for identifying each of the cores in an end face of the MCF.

BACKGROUND ART

In the present specification, definitions of terms are as follows. An MCF includes a plurality of cores extending along a fiber axis in a common cladding. A coating is provided on the outer peripheral surface of the common cladding. "Fiber axis" means a central axis passing the center of a cross section of the common cladding. In general, in a cross section of the MCF perpendicular to the fiber axis of the MCF (hereinafter referred to as "the cross section"), a core constellation defining a relative positional relation of the cores has at least one of line symmetry and rotational symmetry. "Cladding center" means the center of the common cladding cross section. "Cladding shape" means the shape of the outer periphery of the common cladding in the cross section. "Core group" means a group of cores composed of a plurality of cores. "Core group constellation" means a core constellation of a core group in the cross section. "Core group symmetry" means symmetry of the core group constellation in the cross section. As the core group symmetry there are two types of symmetry, rotational symmetry and line symmetry. "Core group position" means a position of a core group in the common cladding cross section. The core group position is a position of a rotation center of a core group when the core group symmetry is rotational symmetry, or, a position of a symmetry axis when the core group symmetry is only line symmetry. "Separation distance" means a distance of the core group position from the cladding center. The separation distance is a separation distance between the rotation center and the cladding center when the core group symmetry is rotational symmetry, or, the shortest distance between the cladding center and a symmetry axis when the core group symmetry is only line symmetry. When a core group has rotational symmetry and line symmetry with respect to two or more axes, a direction of separation of the core group position from the cladding center is "core group separation direction." In that case, the core group separation direction is preferably a direction different from the symmetry axes of line symmetry and more preferably an intermediate direction between neighboring symmetry axes. In cases where a core group has one-axis line symmetry and rotational symmetry and in cases where a core group has only rotational symmetry, the core group separation direction does not matter. "Cladding symmetry" is an index indicative of a structural feature of the common cladding including the core group constellation in the cross section and means symmetry of a figure defined by a combination of the core group constellation and the common cladding. The cladding symmetry depends on the core group position in the common cladding cross section when the shape of the outer periphery of the cladding has no feature concerning asymmetry, e.g., when the shape of the outer periphery of the cladding is in line symmetry and rotational symmetry like a circular shape. "Coating symmetry" means symmetry of a cross-sectional figure defined by a combination of the core group constellation, common cladding, and coating. The coating symmetry depends on both of the position of the cladding center and the cladding symmetry in the cross section when the shape of the outer periphery of the coating provided on the outer periphery of the common cladding has no feature concerning asymmetry.

Figure 1:
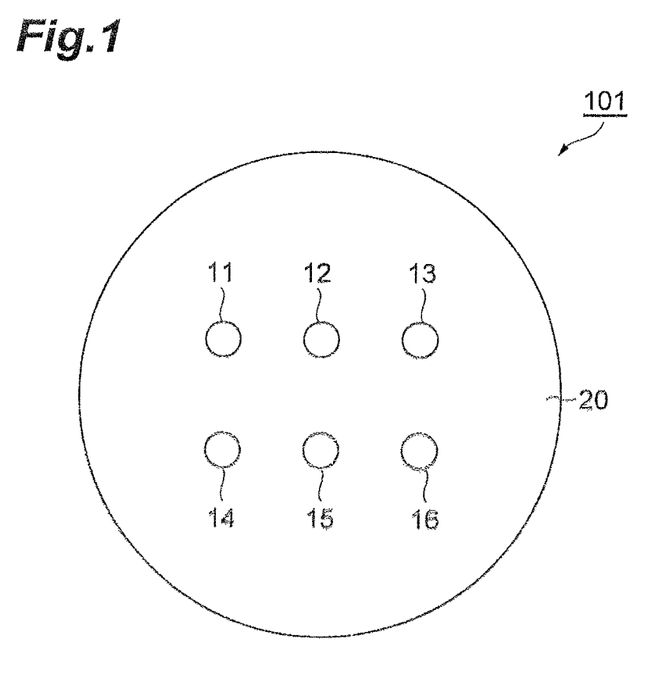
FIG. 1 is a drawing for explaining the cross-sectional structure of MCF 101.
Figure 2:
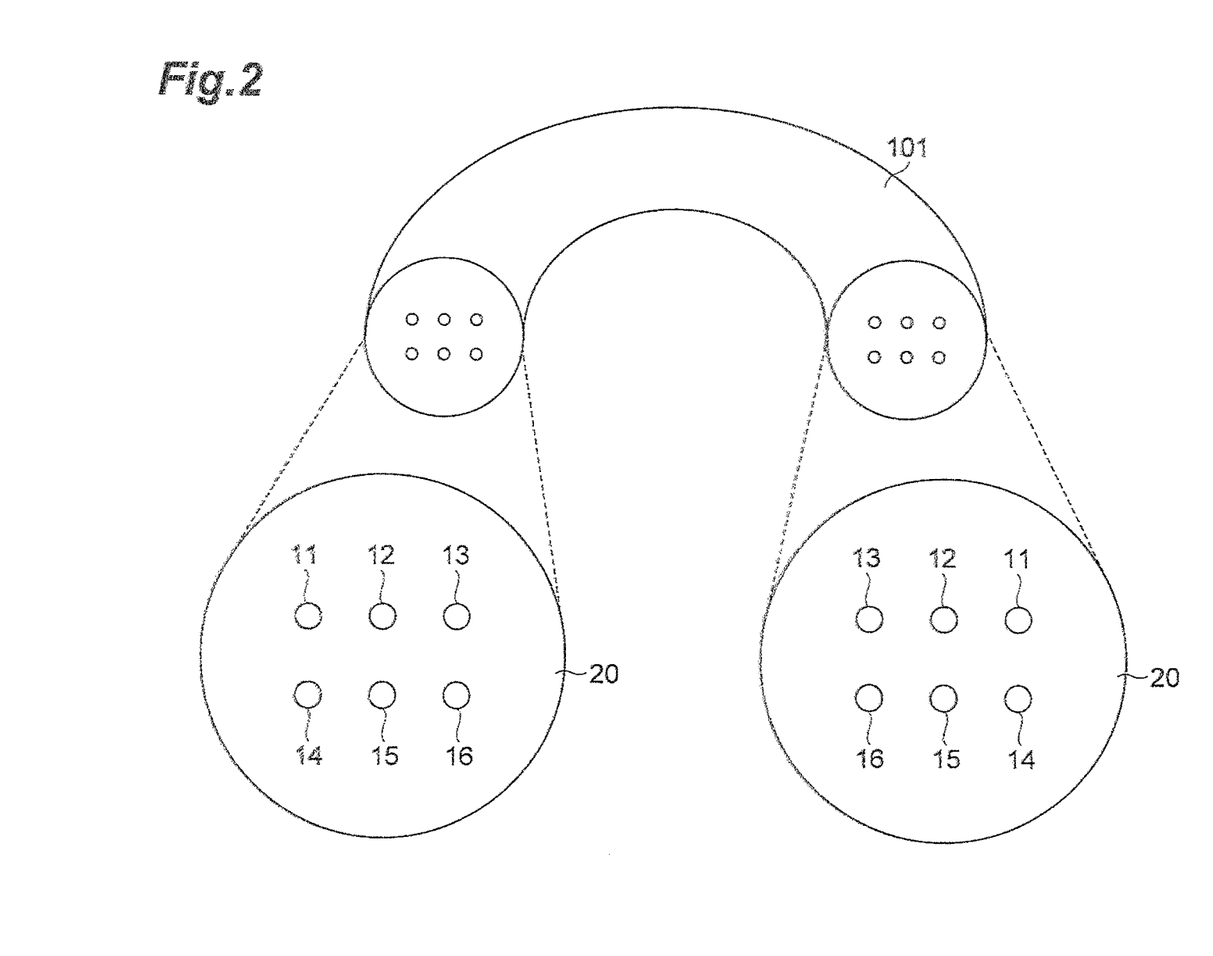
FIG. 2 is a drawing for explaining the configuration in the two end faces of MCF 101.
Figure 3:
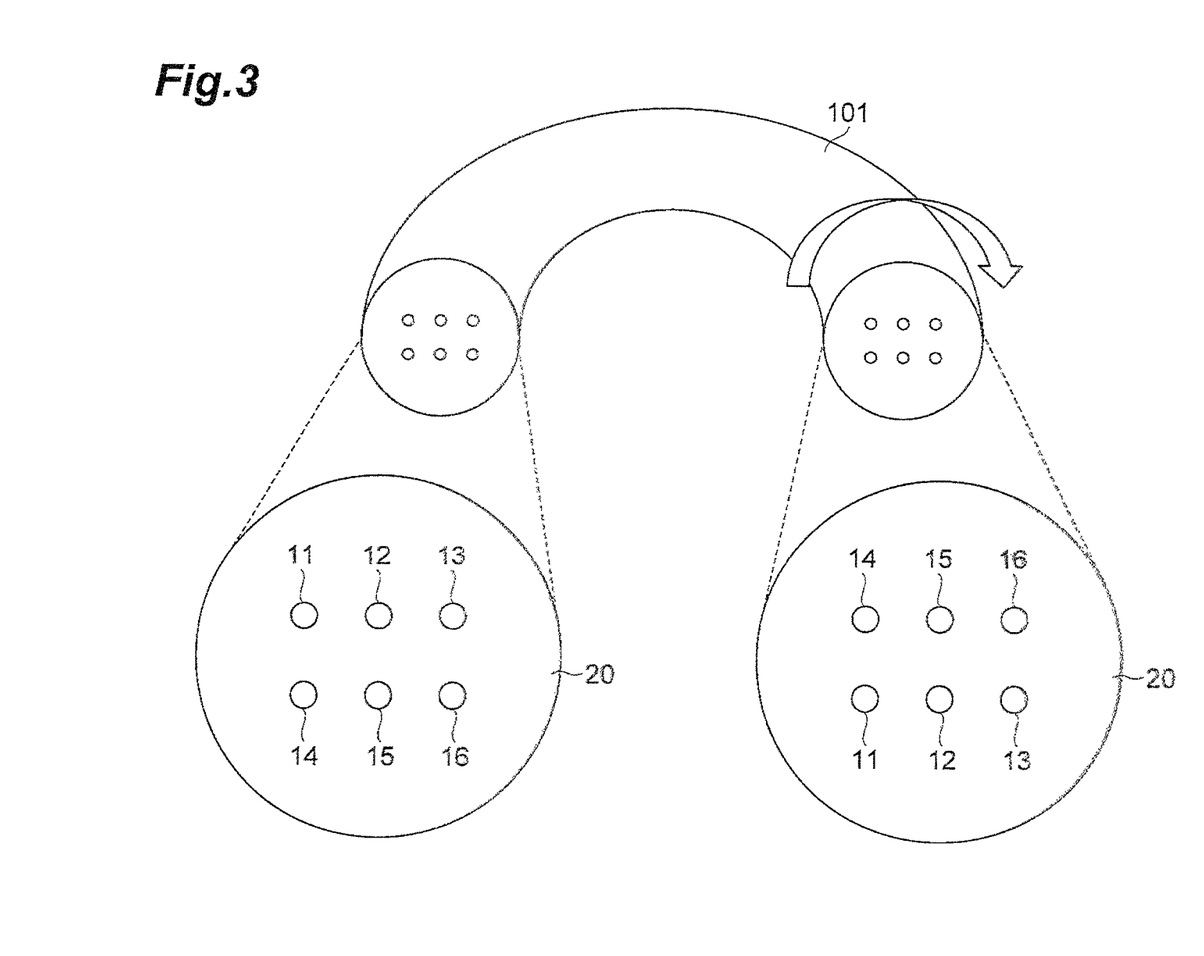
FIG. 3 is a drawing for explaining the configuration in the two end faces of MCF 101.

FIGS. 1 to 3 are drawings for explaining a cross-sectional structure of an MCF 101. In the cross-sectional structure shown in FIG. 1, the MCF 101 has one core group (six cores 11 to 16) and a common cladding 20 including the core group. The six cores 11 to 16 are arranged in two rows and three columns and this core group constellation composed of the six cores 11-16 has both of line symmetry and rotational symmetry. When the core group constellation has rotational symmetry, the rotation center of the core group constellation is the core group position and coincides with the cladding center in ordinary MCFs. In this case, it is difficult to identify each of the cores by only a look at the fiber end face.

FIGS. 2 and 3 show identification of the cores 11-16 at the two ends of the MCF 101. The illustrated cladding shape is a circle, but the cladding shape may be a regular polygon. FIG. 3 is identification of the cores 11-16 with 180° rotation of one end of the MCF 101 about the fiber axis, with respect to FIG. 2. As shown in these FIGS. 2 and 3, the identification of the individual cores is different between one end face and the other end face of the MCF 101 though the core group constellation looks identical. Similarly, with a twist of the MCF 101, the identification of the individual cores also becomes different though the core group constellation looks identical. Just as described, in the case of the general MCF having the core group symmetry, the existence of the symmetry makes the identification of the individual cores difficult.

Figure 4:
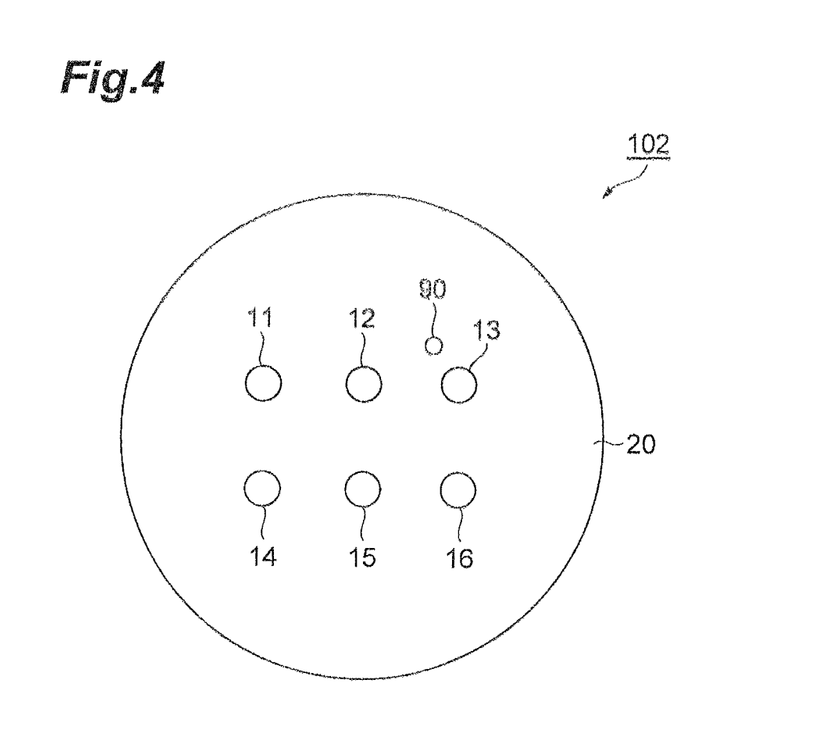
FIG. 4 is a drawing for explaining the cross-sectional structure of MCF 102.

FIG. 4 is a drawing for explaining a cross-sectional structure of an MCF 102. The MCF 102 has a structure including a core identification maker 90 extending along the fiber axis, in the vicinity of the core 13 in the configuration of the MCF 101 shown in FIG. 1. The marker 90 allows identification of the core 13 and thus makes all the cores identifiable.

In the invention disclosed in Patent Literature 1, the cladding shape has only line symmetry, without rotational symmetry. The core group constellation has line symmetry as core group symmetry, but the symmetry axis of the cladding shape is not coincident with the symmetry axis of the core group symmetry. In the invention of Patent Literature 1, therefore, losing both of rotational symmetry and line symmetry as cladding symmetry, it is possible to identify each core at the two ends of the fiber.

Patent Literature 2 discloses the cladding shape with a notch, or, the configuration wherein a dummy core extending along the fiber axis is provided in the cladding. The notch or the dummy core can be used as a marker.

FIG. 5 of Patent Literature 3 discloses the configuration wherein the cladding center lies on the symmetry axis and the core group symmetry includes only line symmetry.

CITATION LIST

Patent Literature

Patent Literature 1: Japanese Unexamined Patent Publication No. 2014-052410
Patent Literature 2: International Publication No. WO2000/016131
Patent Literature 3: Japanese Unexamined Patent Publication No. 2010-055028

SUMMARY OF INVENTION

Technical Problems

The Inventors conducted research on the conventional MCFs and found the problems as described below. In the invention disclosed in Patent Literature 1, for distinguishing the cores in the core constellation of reflection symmetry (line symmetry), the cladding shape must be rotationally asymmetric as major premise; specifically, it is a noncircular shape such as D-shape (shape with a linear cut in part of a circular outer periphery). The D-shape requires a step of processing a preform into the D-shape during manufacture of the preform and the cores become easier to deform because of the cladding shape during drawing, whereby the positions of the respective cores are also likely to vary. FIG. 7 of Patent Literature 1 describes the configuration wherein the cladding shape is circular but the outer periphery of the cross section of the coating is noncircular. In general, when consideration is given to the fact that the fiber rotates during drawing into fiber, it is difficult to accurately control the rotational position thereof throughout the longitudinal direction of the long optical fiber.

In the invention disclosed in Patent Literature 2, the marker such as the notch or the dummy core functions as an index for angle measurement and it necessitates a step of providing the marker. Therefore, the invention of Patent Literature 2 with the marker raises manufacturing cost. In addition, there is a problem that the core constellation is likely to be disordered during manufacture because of the difference between respective viscosities of the marker and the cladding and influence of voids formed during processing of the marker. Furthermore, it is necessary to provide the marker with a certain size easy to visually recognize and, for this reason, the existence of the marker could need decrease in the number of cores, in arranging the cores in high density in the cross section.

In the configuration disclosed in FIG. 5 of Patent Literature 3, the core group constellation has line symmetry and, as pointed out with use of accompanying FIGS. 2 and 3 in the present specification, it is difficult to identify each core, because the arrangement order of the cores is different between one end face and the other end face of the MCF. In the case of the MCF with the core-unidentifiable structure, when it is applied through a step of twisting the fiber, e.g., during splicing between fibers or during a cable forming process, it becomes difficult to follow a characteristic history such as transmission loss and it becomes hard to ensure transmission quality as a transmission line.

The present invention has been accomplished in order to solve the above-described problems and it is an object of the present invention to provide an MCF that has a structure with little adverse effect on core deformation during drawing and that enables easy identification of each core, regardless of the presence or absence of a fiber twist and even with difficulty in identification of fiber end. "Identification" in the present specification may be an identifiable state at the level of visual observation or an identifiable state at the level of a monitor screen by end face monitoring.

Solution to Problems

An MCF according to an embodiment of the invention comprises: a core group composed of a plurality of cores extending along a fiber axis; a common cladding including the core group and having a circular cross-sectional outer periphery; and a coating covering the outer periphery of the common cladding. For achieving the above object, this MCF satisfies either one of first and second configurations. In the first configuration, a core group position (position of the core group in the common cladding) is set at a predetermined position to break cladding symmetry (symmetry of a figure defined by a combination of the common cladding and the core group constellation, in the cross section). In the second configuration, the cladding symmetry in the cross section is symmetry defined by only one line symmetry axis and the coating has a distinguishing marker for distinguishing a fiber end (hereinafter referred to as "distinguishing marker").

Specifically, in the first configuration, the core group constellation in the cross section has at least one type of core group symmetry out of line symmetry and rotational symmetry. The core group is so arranged that it can be confirmed that all types of cladding symmetry are broken, from a relation with the core group position. As a result, as in the cross section of an MCF 1A shown in FIG. 5B, it becomes feasible to identify each of six cores 11-16. The "core group position" is, specifically, a position of the core group relative to the common cladding, as described in the first paragraph in the "Background Art" section, and, when the core group constellation has rotational symmetry, the rotation center thereof is not coincident with the cladding center (the center of the common cladding cross section). In another configuration, when the core group constellation has only line symmetry, the cladding center is not present on a line symmetry axis of the line symmetry. As the core group position is set relative to the common cladding in this manner, the cladding symmetry is broken. When the core group constellation has both of rotational symmetry and line symmetry, a separation direction, for example in the case of a regular hexagon which has six line symmetry axes, is preferably an intermediate direction between any two neighboring axes. If the separation direction coincides with any one of the six axes, there will remain line symmetry.

Advantageous Effects of Invention

In the MCF according to the embodiment of the invention, each core can be identified in either of the two end faces, regardless of the presence or absence of a twist. For the purpose of the core identification, there is no need for providing the marker in the cladding and for partially deforming the outer peripheral shape of the cladding. Since the interior and exterior of the cladding are not processed, the embodiment of the invention is effective in suppression of increase in cladding processing cost and suppression of deformation into special shape of the cores during drawing due to deformation into special shape of the common cladding. The core group constellation itself has symmetry, which is suitable for manufacture of a connection component with symmetry maintained. As described above, the embodiment of the invention has enabled manufacture of the MCF having high performance while maintaining the symmetry of the core group constellation.

DESCRIPTION OF EMBODIMENTS

Description of Embodiment of Invention

First, aspects of the embodiment of the invention will be described as enumerated below.

(1) An MCF according to the embodiment of the invention comprises: a core group consisting of a plurality of cores; a common cladding including the core group and having a circular cross-sectional outer periphery; and a coating covering the outer periphery of the common cladding. As a first aspect, in a cross section of the MCF perpendicular to a fiber axis, a core group constellation defining a relative positional relation of the cores constituting one core group has at least one type of symmetry out of line symmetry and rotational symmetry. A core group position is separated by a predetermined distance from a cladding center and the separation by the predetermined distance makes it recognizable that the core group position is separated in a predetermined separation direction to break all types of symmetry in the cross section of the MCF. As a result, each core in the core group becomes identifiable, based on a relation between the separation direction and the core group constellation.

The separation distance between the core group position and the cladding center is confirmed as separation on a monitor screen in observation of an end face of the MCF, thereby making the separation direction confirmable. The predetermined distance is a distance that can be confirmed on the monitor screen. Specifically, the predetermined distance is, preferably, not less than 1 µm. However, if the separation distance is too large, the cores might deform during drawing and thus the separation distance is preferably as small as possible within a range permitting confirmation of the separation.

(2) As a second aspect, this MCF may have a configuration wherein in the cross section thereof the core group constellation has symmetry defined by only one line symmetry axis and a distinguishing marker for distinguishing fiber end is provided at an arrangement position on an inner periphery, in an interior, or on an outer periphery of the coating. In this case, the distinguishing marker allows an end face of interest in identification of each core in the core group to be distinguished from the other end face of this MCF and makes the individual cores identifiable from a relation of the distinguished end with the core group constellation. Application of this configuration is limited to cases where the core group constellation has symmetry defined by only one line symmetry axis but there is no need for separating the core group from the cladding center and the individual cores can be identified by only visual observation of the fiber end face. It is considered that the identification of the cores can be made possible by only confirmation of the position of the distinguishing marker but, in that case, it is practically difficult to control alignment between the marker position and the rotational position of the core group, in a process of coating the fiber.

The distinguishing marker may be one that gives circumferential directionality to directions of the outer periphery of the common cladding, for distinguishing the fiber end. The circumferential directionality, specifically, means indication of a circumferential orientation by processing the distinguishing marker in an arrow shape, in the cross section of the MCF. The shape of the distinguishing marker may be any shape by which the circumferential direction can be recognized, such as a triangle, a rectangle, or an ellipse, in addition to the arrow. Besides the shape, it is also possible to make the circumferential direction recognizable by two different distinguishing markers (marker elements) located at unopposed positions on the circumference. The two different distinguishing markers may be markers different in any one of the shape, color, radial arrangement position (e.g., one on the inner periphery and the other on the outer periphery), and the number of constituent markers between the distinguishing markers.

(3) A core identifying method according to the embodiment of the invention identifies each of the cores in the core group in each of the MCFs of the first and second aspects. Specifically, in the first aspect, it is necessary to identify the separation direction, and the separation distance as a basis thereof is at the µm level, which can hardly be recognized by direct visual observation. For this reason, this core identifying method comprises: monitoring one end face of the MCF; determining the separation direction, based on an image of the monitored end face; and identifying to which core in design each of the cores corresponds, based on a relation of the determined separation direction with a known core group constellation. The separation direction is confirmed by visual observation or by calculation on the image. In the calculation, the cladding center and the core group position are determined on the image and the separation direction is calculated from the positional relation of them. In the second aspect, the fiber end and the core group constellation are confirmed and each core in the core group is identified from a relation of them. Specifically, the interior of the coating or a surrounding region thereof is provided with a circumferential direction indication function to allow the fiber end distinguishing. The circumferential direction indication function in the fiber end permits the fiber end to be distinguished by either clockwise rotation or counter-clockwise rotation. When the core group constellation has symmetry defined by only one line symmetry axis, each core in the core group can be identified by a relation of the distinguished fiber end with the core group constellation. In this case, each core can be identified without a magnifying glass.

DETAILS OF EMBODIMENT OF INVENTION

Specific structures of the MCFs and core identifying methods according to the embodiment of the invention will be described below in detail with reference to the accompanying drawings. It should be noted that the present invention is not limited only to these illustrative examples and is intended for inclusion of all changes within the meaning and scope of equivalency to the scope of claims, as described in the scope of claims.

FIGS. 5A to 10H show the cross-sectional structures of MCFs according to the embodiment of the invention. Specifically, FIGS. 5A, 6A, 7A, 8A, and 9A show the cross-sectional structures of MCFs 1B to 5B, respectively, as comparative examples and FIGS. 5B, 6B, 7B, 8B, 9B, 10A to 10D, and 10E to 10H show the cross-sectional structures of MCFs 1A to 5A, $6A_1$ to $6A_4$, and $6B_1$ to $6B_4$ according to the first to sixth embodiments, respectively. In each drawing, each core of the MCF of the embodiment is located at a position resulting from parallel translation of each core of the MCF of the comparative example corresponding thereto. In FIGS. 5B, 6B, 7B, 8B, and 9B, dotted circles indicate core positions in the MCF of the comparative example corresponding to each embodiment. In these drawings A' and B' indicate line symmetry axes moved from those in the comparative example. In each comparative example and each embodiment, the MCFs have the same core group. The core group in each example consists of three or six cores (cores 11-13 or cores 11-16). It is noted, however, that the number of cores constituting the core group can be two or more, without having to be limited to three or six. A common cladding 20 includes the core group and is comprised of silica-based glass. The common cladding 20 has the outer periphery of a circular cross section centered at the center position C (hereinafter referred to as "center C"). A coating 30 is provided on the outer periphery of the common cladding 20.

First Embodiment

Figure 5A:
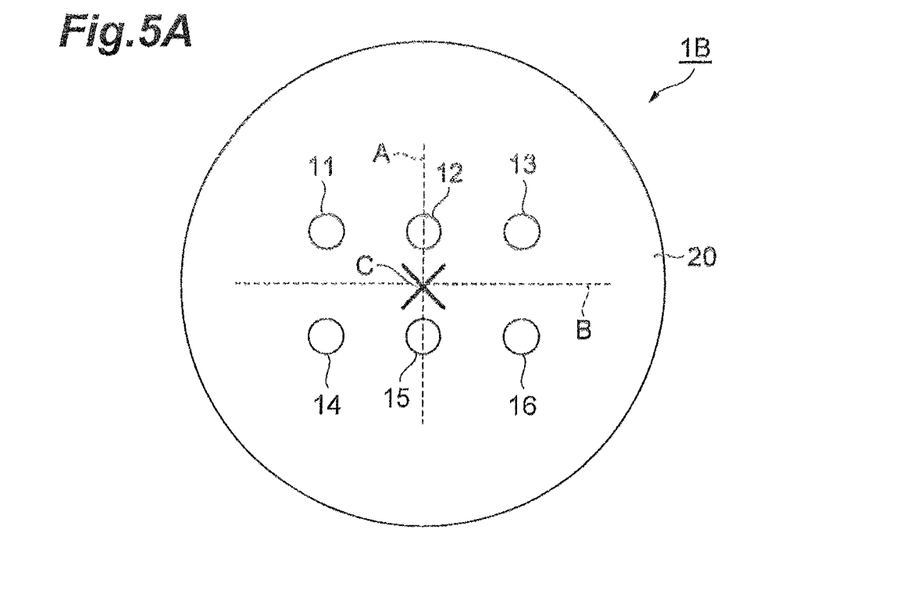
FIGS. 5A and 5B are drawings for explaining the cross-sectional structure of MCF 1A of the first embodiment.

In the MCF 1B of the first comparative example, as shown in FIG. 5A, the cores 11-16 belonging to one core group are arranged in two rows and three columns in such a manner that the core constellation thereof has both of line symmetry and rotational symmetry, in the cross section. The core constellation in the core group shown in FIG. 5A has line symmetry with respect to symmetry axes A and B of two axes orthogonal to each other. The core constellation has rotational symmetry with respect to a center at an intersection between the two symmetry axes. (In general, in the case of symmetry defined by symmetry axes of two or more axes, an intersection thereof is a rotation center and the core group has rotational symmetry.) The core group position is the position of the intersection between the two symmetry axes serving as the rotation center and coincides with the center C. In this case, the core group symmetry is maintained as cladding symmetry.

Figure 5B:
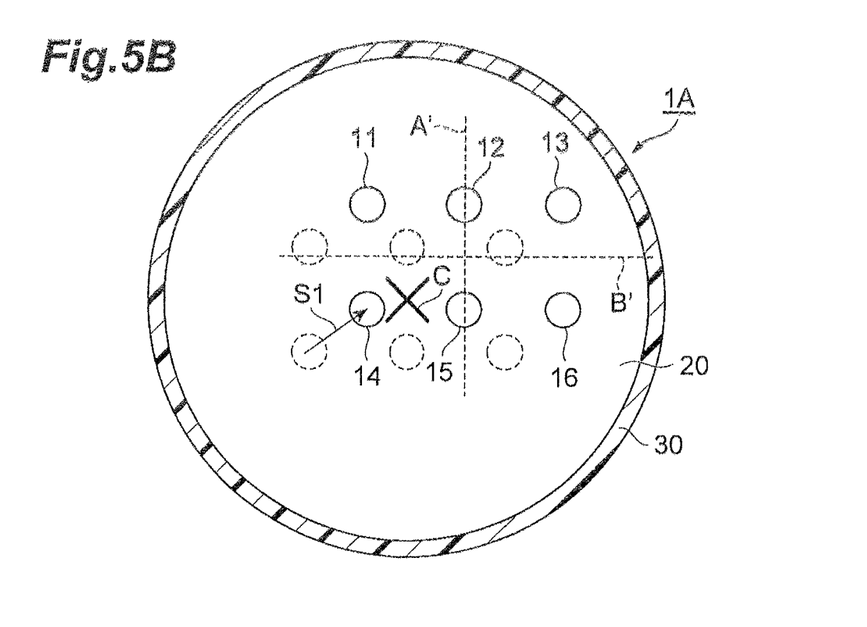

The MCF 1A of the first embodiment has the same configuration of the core group as the MCF 1B of the first comparative example. The difference between the first comparative example and the first embodiment is the core group position, as shown in FIG. 5B, such that the axis A and axis B both are translated to positions of axis A' and axis B' whereby the core group position corresponding to an intersection between the axis A' and axis B' is separated by a distance corresponding to a length of an arrow S1 from the center C of the common cladding 20. It is important that the core group position, i.e., the rotation center position of the core group be translated from the cladding center, thereby breaking all types of cladding symmetry. The separation direction of the core group position from the rotation center is the direction indicated by the arrow S1 in FIG. 5B. It is important that the separation direction be a direction of separation from all the line symmetry axes, in order to break all types of cladding symmetry in the cross section. In the first embodiment, the separation direction is desirably an intermediate direction between the two directions of the axis A' and axis B'. If the separation direction is a direction except for the intermediate, it will be difficult to confirm the separation direction unless the separation distance is a certain length. This breaks both of the line symmetry and rotational symmetry as a whole of the cross section and makes each core identifiable.

The predetermined distance corresponding to the length of the arrow S1 is illustrated so as to look large on the drawing, for easier recognition, but it is preferably several μm or so, for avoiding non-circular deformation of the cores, and preferably not less than 1 μm, for making the separation distinguishable. The predetermined distance is preferably set so that lengths of components in directions perpendicular to the respective axes A and B are not less than 1 μm. The separation direction does not have to be recognizable by direct visual observation, but may be one recognizable by a computation process based on information of a monitor image. This is also the case with the other embodiments where the core group position is separated from the cladding center.

Second Embodiment

Figure 6A:
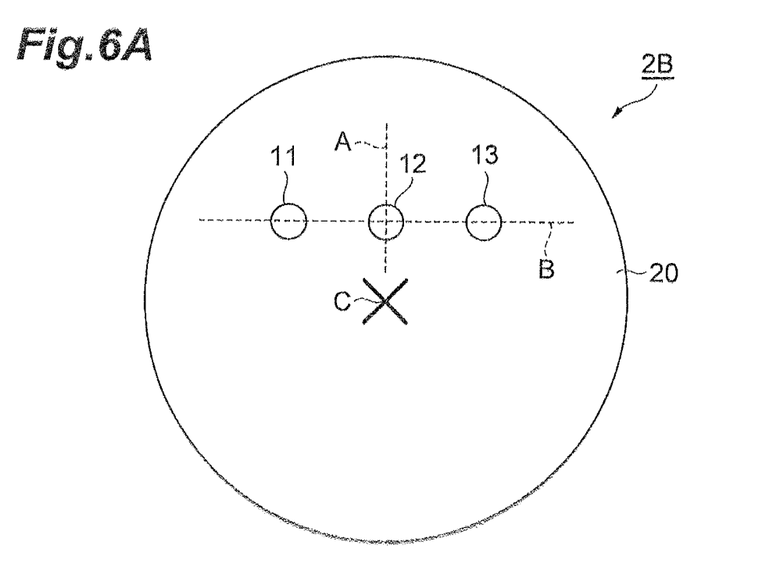
FIGS. 6A and 6B are drawings for explaining the cross-sectional structure of MCF 2A of the second embodiment.
Figure 6B:
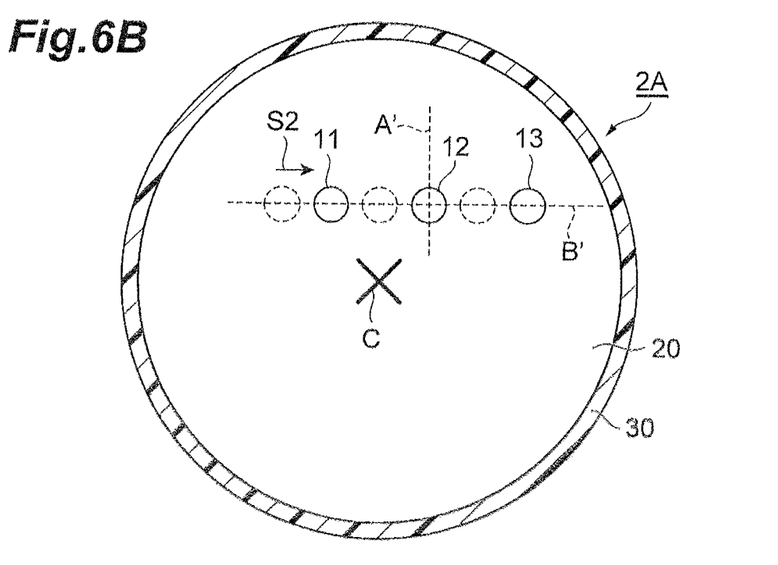

In the MCF 2B of the second comparative example, as shown in FIG. 6A, the cores 11-13 are arranged in one row in such a manner that the core constellation has line symmetry defined by only a line symmetry axis of one axis, in the cross section. The axis A is a single line symmetry axis and passes the center C of the common cladding 20. The MCF 2A of the second embodiment has the same configuration of the core group as the MCF 2B of the second comparative example. The difference between the second comparative example and the second embodiment is the core group position, as shown in FIG. 6B, such that only the axis A is translated to the position of the axis A' (while the axis B in FIG. 6A coincides with the axis B' in FIG. 6B) whereby the core group position corresponding to the intersection between the axis A' and axis B' is separated in a direction indicated by an arrow S2 from the center C of the common cladding 20. It is important that the core group position, i.e., the position of the axis A' defining the core group position be separated from the center C of the common cladding 20, thereby breaking all types of cladding symmetry. Although the axis B can also be translated, the comparative example is an example where the separation of the axis B from the center C of the common cladding 20 cannot be discriminated.

Third Embodiment

Figure 7A:
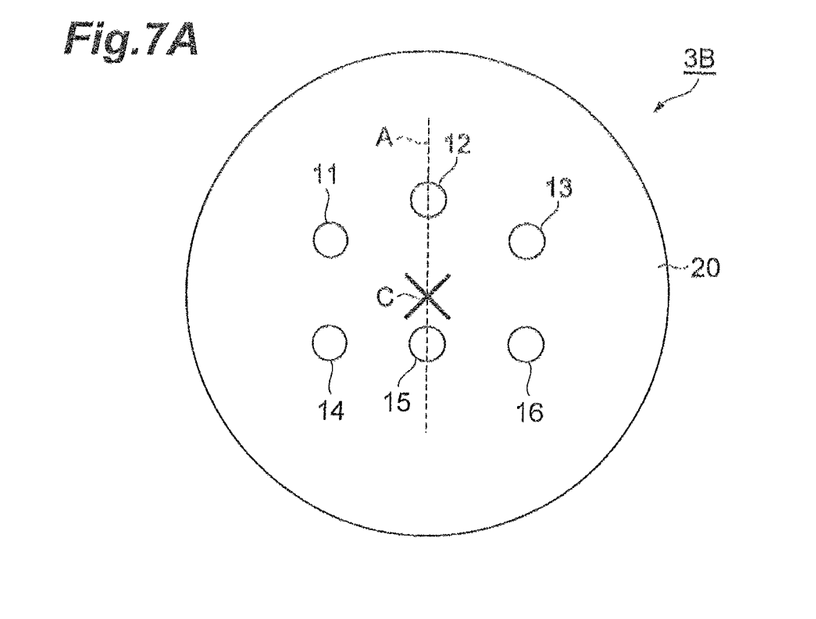
FIGS. 7A and 7B are drawings for explaining the cross-sectional structure of MCF 3A of the third embodiment.

In the MCF 3B of the third comparative example, as shown in FIG. 7A, only the position of the core 12 is moved along the axis A being the symmetry axis and the symmetry of the core group constellation has only the line symmetry defined by the axis A (line symmetry axis of one axis).

Figure 7B:
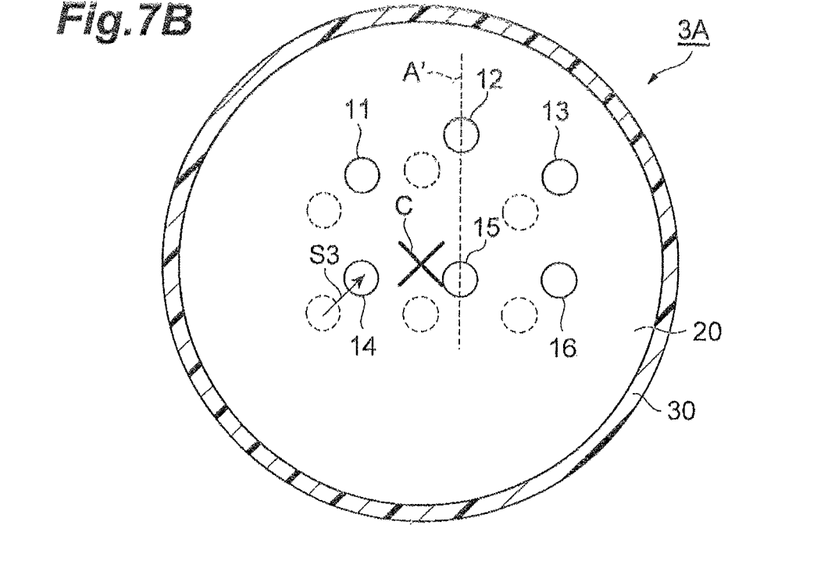

The difference between the MCF 3A of the third embodiment and the MCF 3B of the third comparative example is the core group position, as shown in FIG. 7B, such that the axis A is translated to the position of the axis A' along a direction indicated by an arrow S3 in FIG. 7B and, as a result, the axis A' is separated by a distance corresponding to a length of a component of the arrow S3 orthogonal to the axis A' from the center position C of the common cladding 20. This makes the cladding symmetry lose the line symmetry resulting from the fact that the axis A lies on the center C of the common cladding 20, whereby each core becomes identifiable. In the present embodiment, the core group constellation is also translated in the direction along the axis A, as well as in the direction orthogonal to the axis A, but the cores are already identifiable in the direction along the axis A; therefore, only the translation in the direction orthogonal to the axis A is sufficient.

Fourth Embodiment

Figure 8A:
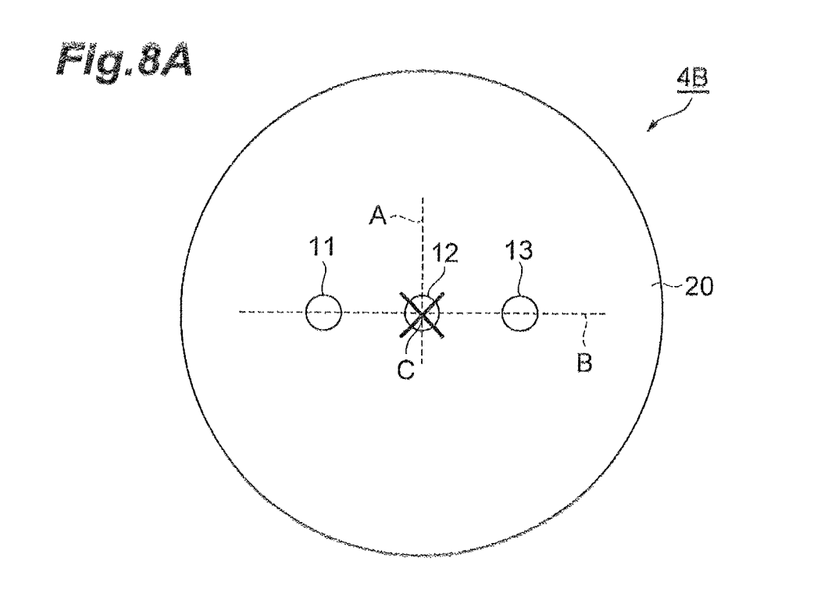
FIGS. 8A and 8B are drawings for explaining the cross-sectional structure of MCF 4A of the fourth embodiment.

In the MCF 4B of the fourth comparative example, as shown in FIG. 8A, the three cores 11-13 belonging to the core group are arranged in symmetry with respect to two axes of the axis A and axis B passing the center C of the common cladding 20. In this manner, the core group constellation of the fourth comparative example has the line symmetry and rotational symmetry and it is difficult to identify each core.

Figure 8B:
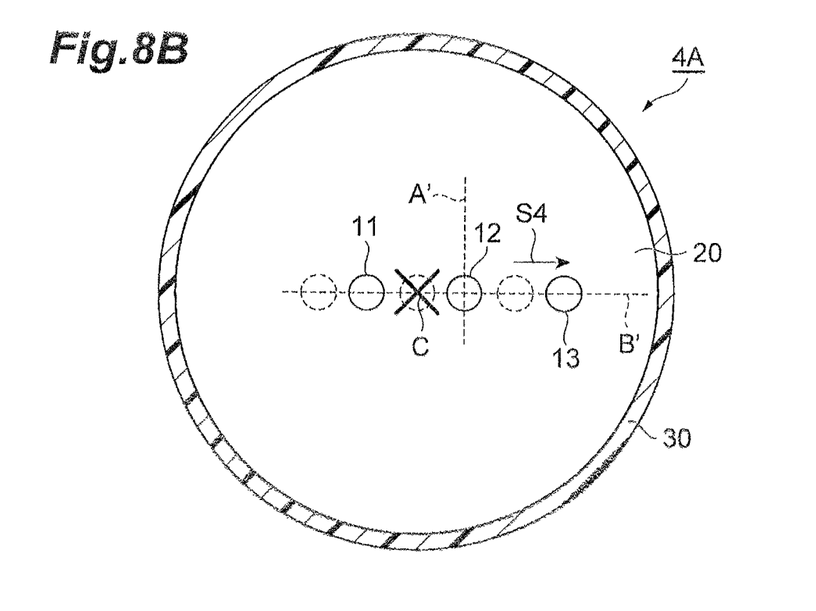

The difference between the MCF 4A of the fourth embodiment and the MCF 4B of the fourth comparative example is, as shown in FIG. 8B, that the position of the core group of the three cores 11-13 is changed by translation of the axis A and axis B to positions of the axis A' and axis B' along a direction indicated by an arrow S4 (which coincides with the direction along the axis B), so as to lose the line symmetry with respect to the B axis and A axis, thereby breaking all types of symmetry of the cladding symmetry.

Fifth Embodiment

Figure 9A:
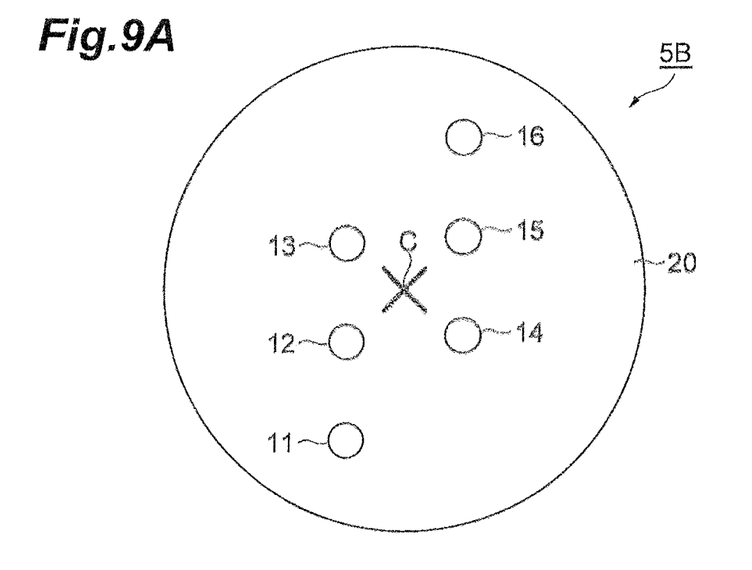
FIGS. 9A and 9B are drawings for explaining the cross-sectional structure of MCF 5A of the fifth embodiment.

In the MCF 5B of the fifth comparative example, as shown in FIG. 9A, the six cores 11-16 belonging to the core group are arranged on opposed sides of a parallelogram and the core group constellation thereof has no line symmetry but has only rotational symmetry. In the cross section, the rotation center of the core group constellation coincides with the center C of the common cladding 20 and the cladding symmetry has rotational symmetry; therefore, it is difficult to identify each core.

Figure 9B:
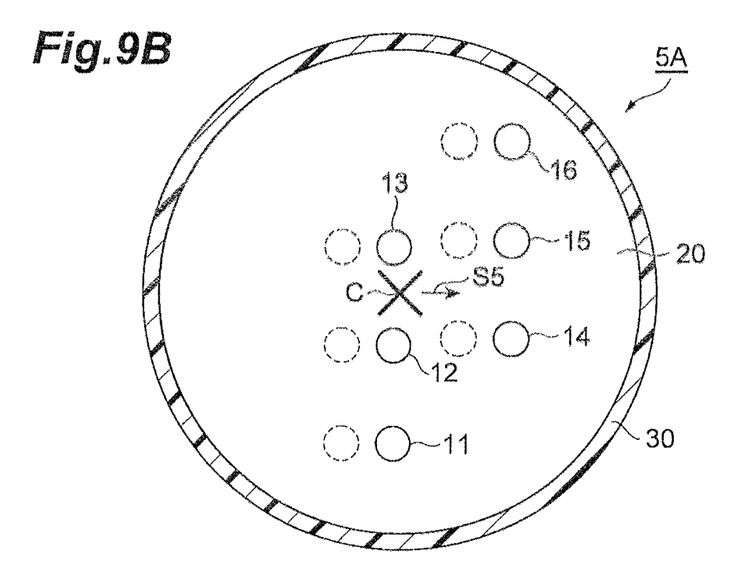

In both of the MCF 5A of the fifth embodiment and the MCF 5B of the fifth comparative example, the core group position is the rotation center of the core group constellation and the difference between them is that the core group position is separated by a predetermined distance along a direction of an arrow S5 in FIG. 9B. For breaking the cladding symmetry, the separation direction may be any direction.

Sixth Embodiment

The second comparative example of FIG. 6A and the third comparative example of FIG. 7A have the symmetry defined by the line symmetry axis of one axis and they serve as comparative examples to the sixth embodiment. MCFs $6A_1$ to $6A_4$ of FIGS. 10A to 10D show the present embodiment to the second comparative example of FIG. 6A, and MCFs $6B_1$ to $6B_4$ of FIGS. 10E to 10H show the present embodiment to the third comparative example of FIG. 7A. The present embodiment is different from the comparative examples in that there are two fiber end distinguishing markers 40a, 40b (hereinafter referred to as "distinguishing markers") as a plurality of marker elements, on the outer periphery of the coating 30. The two distinguishing markers are different markers and are provided at two unopposed points on the circumference. The fiber end is identified based on a specific direction defined by whether a relation between the two points in close vicinity on the circumference is an order of [distinguishing marker 40a, distinguishing marker 40b] or an order of [distinguishing marker 40b, distinguishing marker 40a], as clockwise arrangement. When the cladding symmetry has the line symmetry defined by a line symmetry axis of one axis, as long as the fiber end is identified, the identification of the cores is possible by only confirming the fiber end, regardless of the presence or absence of a twist of the MCF.

Figures 10A, 10B, 10E, 10F:
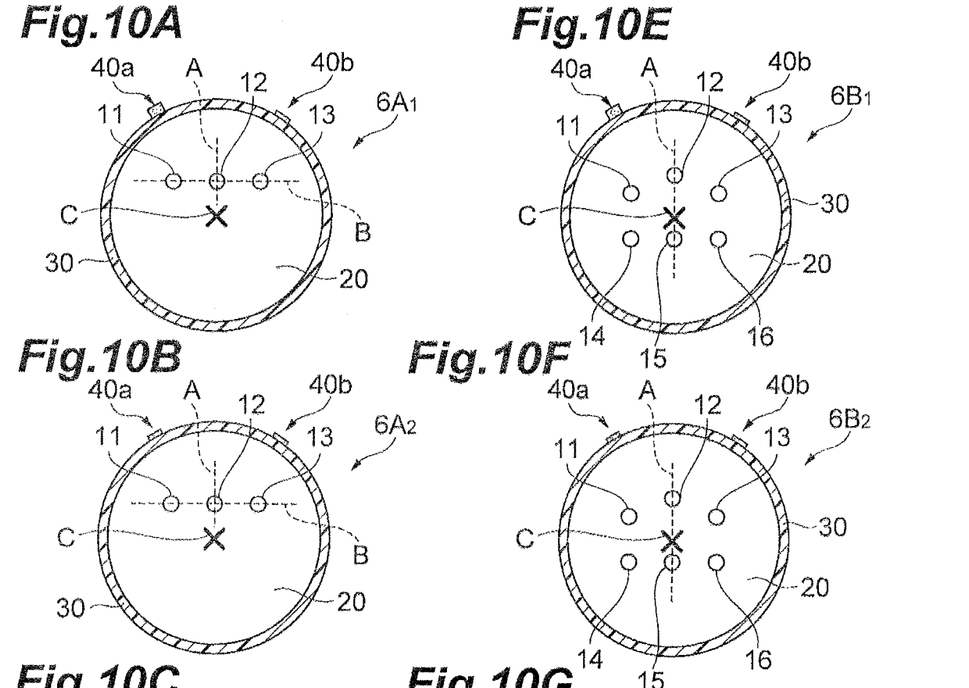
FIGS. 10A to 10H are drawings showing various examples of fiber end distinguishing markers provided for each of the MCFs shown in FIGS. 6A and 7A.
Figure 10C:
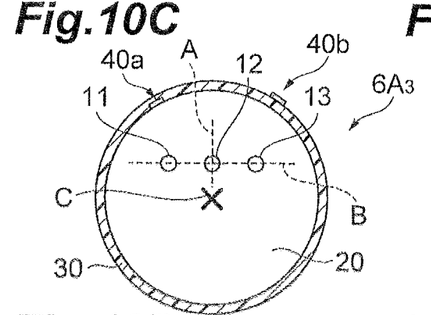
Figure 10D:
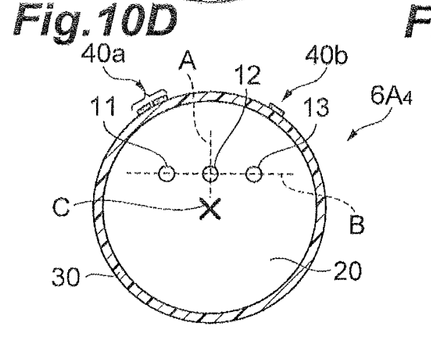
Figure 10G:
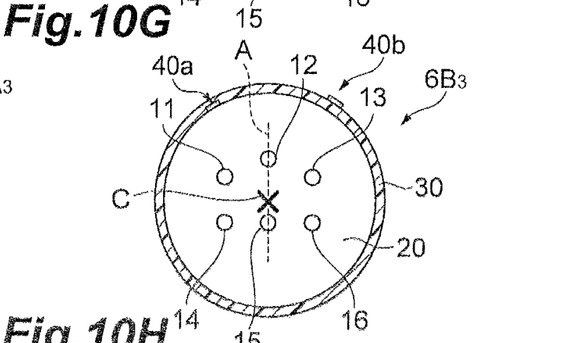
Figure 10H:
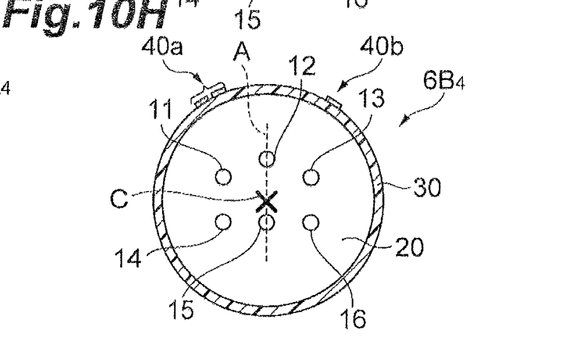

The distinguishing markers may be any markers that allow the difference between them to be distinguished, and a distinguishing factor thereof may be a difference in any of "shape," "color," "position," and "number" on the end face. FIGS. 10A and 10E show the MCF $6A_1$ and MCF $6B_1$, respectively, provided with the distinguishing markers 40a, 40b having their respective shapes different from each other; FIGS. 10B and 10F show the MCF $6A_2$ and MCF $6B_2$, respectively, provided with the distinguishing markers 40a, 40b having their respective colors different from each other; FIGS. 10C and 10G show the MCF $6A_3$ and MCF $6B_3$, respectively, provided with the distinguishing markers 40a, 40b disposed at different positions; FIGS. 10D and 10H show the MCF $6A_4$ and MCF $6B_4$, respectively, provided with the distinguishing markers 40a, 40b different in the number of constituent marks. The shape may be difference in size. The position is radial position, which may be any one of locations "on the inner periphery of the coating," "in the coating," and "on the outer periphery of the coating." The number may be two marks [●●] against one mark [●]. The necessary number of distinguishing markers is two or more in terms of the positional relation, without having to be limited to two.

One distinguishing marker may suffice. In that case, the shape of the marker is configured so as to allow a specific direction on the circumference to be recognized. The shape of the marker may be any shape with discriminable directionality, e.g., a symbolic mark [<] or [▲], or a group of marks based on a combination of large and small marks. e.g., [●○] or [○●], or a group of marks based on a combination of different marks, e.g., [●○], [◉●], or [●▲].

The present embodiment is limited to cases where the cladding symmetry has the line symmetry defined by the line symmetry axis of one axis, but is superior in that the cores can be identified by only confirming the distinguishing markers of the coating. Depending upon the size of the coating, there are cases where it is difficult to confirm the distinguishing markers by visual observation, but they can be confirmed with use of a magnifying glass, necessitating no calculation on the monitor screen.

In one of the MCFs according to the present embodiment, while the core group has at least one type of symmetry, the core group position is arranged at the position to break all types of cladding symmetry. In this case, each core can be identified by just confirming one end face. The core identification enables a follow-up operation to trace transmission characteristics between processing steps.

The MCFs according to the present embodiment require neither provision of a marker in the cladding nor deformation of the cladding contour from the circular shape. For this reason, the MCFs of the present embodiment can suppress occurrence of problems such as reduction in the number of cores, degradation of accuracy of the core positions, and irregular shape deformation of the cores, and can suppress increase in manufacturing cost.

Since the MCFs of the present embodiment are configured with the symmetry of the core group (the line symmetry or the rotational symmetry) maintained, they are easily connected to an external device such as a WSS (wavelength selective switch) to be connected while maintaining the symmetry. Since the fiber is easy to arrange in core arrangement, it can be connected to a connected fiber even in a case where the connected fiber has no symmetry of the core group.

In one of the MCFs of the present embodiment, the cladding symmetry has line symmetry defined by only a line symmetry axis of one axis and the coating is provided with the distinguishing markers for identification of the fiber end. This allows all the core positions to be identified by only a look at the distinguishing markers during observation of the fiber end in an operation of splicing the MCFs at a connection site, and the identified cores can be brought into an approximately aligned state.

It is difficult to restrain rotation of the optical fiber up to a wind-up process of the optical fiber during drawing of the optical fiber by the current manufacturing technology, but it is possible to confirm the directions of the distinguishing markers and thus to identify the fiber end.

(Core Identifying Method)

Figure 11:
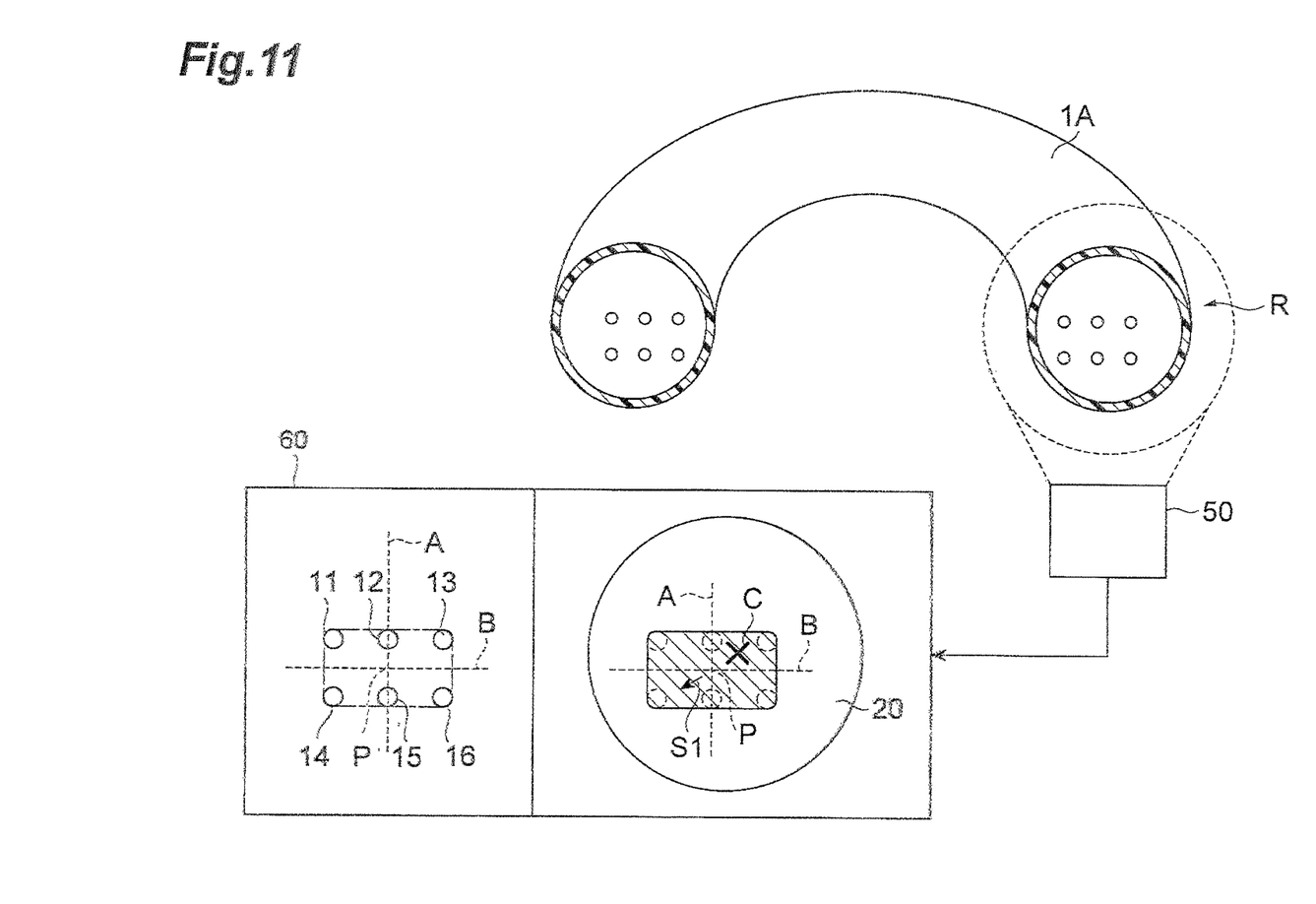
FIG. 11 is a drawing for explaining a core identifying method according to the embodiment of the invention.

A core identifying method according to the embodiment of the invention, i.e., a method for identifying each core included in the MCF having the cross-sectional structure as described above will be described using FIG. 11. FIG. 11 shows an example using the MCF 1A of the first embodiment shown in FIG. 5(b) as an object, for identifying each of the six cores 11-16 in the end face of the MCF 1A.

Generally, even with focus on one core included in the MCF 1A, the core position in each end face of the MCF 1A varies because of such factors as the difference of the fiber ends, rotation of the fiber during drawing, and a twist, as shown in FIGS. 2 and 3. Therefore, it is necessary to monitor the end face of the MCF 1A and identify to which core among the cores 11-16 shown in FIG. 5B (cores in design as known information) each core that can be confirmed on the monitor screen, corresponds. In the core identifying method, the end face monitoring is carried out in a state in which one end face of the MCF 1A is located in an imaging area R of an imaging device 50. An image of the end face taken by the imaging device 50 is displayed on a monitor 60. As the known information, the core constellation in the MCF 1A is defined by the relative positional relation of the six cores 11-16 and has the two symmetry axes A, B. The position of the core group (the center position of the core constellation) composed of these cores 11-16 is the intersection P between the two symmetry axes A and B.

In this core identifying method, first, an arithmetic mean position of the cores in the core group is calculated from the image Information of the monitor 60, thereby calculating a rotational symmetry position of the core group (the intersection P between the symmetry axes); the separation direction of the core group position is determined from a position that can be calculated as a center position (position of the center C) by approximation of the outer periphery of the cross section of the common cladding 20 to a circle; each core can be identified from the separation direction and the symmetry of the core group constellation. This method can be applied to any object with rotational symmetry and is also applicable to the core group without line symmetry as shown in FIGS. 9A and 9B.

In the structure wherein the core group constellation has only the line symmetry (structure wherein the line symmetry is defined by only a line symmetry axis of one axis), the core group position can be only the position information of the line symmetry axis. When the line symmetry axis is vertical, the separation direction is identified by whether the position of the center C of the common cladding 20 is on the right or on the left of the line symmetry axis. Each core can be identified in the same manner as in the above case where the core group constellation has the rotational symmetry.

The separation distance corresponding to the length of the arrow S1 is preferably not less than 1 μm, for confirming the separation direction. On the other hand, if it is too large, there is a possibility of occurrence of the problem of core deformation. When the separation distance between the core group position located at the intersection P and the center C of the common cladding 20 is at the level of several pin, it is difficult to confirm the separation direction and separation distance from the center C of the common cladding 20 to the core group position (intersection P) by visual observation. For this reason, the separation distance is preferably confirmed in the monitor image of the cross section of the MCF. In the case where it is difficult to confirm the separation distance on the image by visual observation, this case is handled by confirming the separation distance by calculation of the center C of the common cladding 20 and the core group position, as described above. The separation distance may be set to less than 1 μm if there is improvement in confirmation technology by calculation and reduction in variation in manufacture.

REFERENCE SIGNS LIST 1A, 2A, 3A, 4A, 5A, $6A_1$ to $6A_4$, and $6B_1$ to $6B_4$ multicore optical fibers (MCFs); 11-16 cores; 20 common cladding; 30 coating; 40a and 40b fiber end distinguishing markers (marker elements).

The invention claimed is:

1. An optical fiber comprising: a core group composed of a plurality of cores extending along a fiber axis; a common cladding comprised of silica-based glass and surrounding the core group; and a coating covering an outer periphery of the common cladding, wherein in a cross section of the optical fiber perpendicular to the fiber axis, the common cladding has a circular outer peripheral shape and all cores, including the core group, in the optical fiber constitute a constellation having symmetry, and wherein the optical fiber satisfies either one of first and second configurations, the first configuration being defined in that:

in the cross section, the symmetry of the constellation is at least one of line symmetry and rotational symmetry; and in the cross section, a position of the constellation in the common cladding is shifted in a predetermined direction from a cladding center of the common cladding such that a distance between at least some of the cores in the core group and the cladding center of the common cladding increases and, as a result, a symmetry of the entire common cladding featuring a structure of the common cladding surrounding the core group constellation are broken, the second configuration being defined in that:
in the cross section, the entire common cladding has symmetry defined by only a line symmetry axis of one axis; and
the coating is provided with a distinguishing marker for distinguishment of a fiber end.

2. The optical fiber according to claim 1, wherein the optical fiber satisfies the first configuration, and a separation distance of the position of the constellation from the cladding center is defined by a space from the cladding center to a rotation center of the core group while the symmetry of the constellation has rotational symmetry, and
wherein the separation distance is not less than 1 μm and less than a radius of the common cladding.

3. The optical fiber according to claim 1, wherein the optical fiber satisfies the second configuration, and the distinguishing marker includes at least one marker element arranged inside the coating so as to indicate a specific direction on the circumference of the coating.

4. The optical fiber according to claim 3, wherein a mode of the distinguishing marker to indicate the specific direction is a mode in which the distinguishing marker has a circumferential directionality.

5. The optical fiber according to claim 3, wherein a mode of the distinguishing marker to indicate the specific direction is a mode in which the distinguishing marker comprises two marker elements arranged at unopposed positions and making the two marker elements different from each other in at least one of color, shape, and arrangement position.

6. A method of identifying a core of the optical fiber as set forth in claim 1, the optical fiber satisfying the first configuration, the method comprising:
monitoring one end face of the optical fiber;
determining the predetermined direction from a positional relation between the cladding center and a position of the constellation on an image of the end face monitored; and
identifying each of the cores in the core group, based on the determined separation direction and the constellation.

7. A method of identifying a core of the optical fiber as set forth in claim 1, the optical fiber satisfying the second configuration, the method comprising:
discriminating which end of the optical fiber is seen, from the distinguishing marker on one end face of the optical fiber; and
identifying each of the cores in the core group, based on the discriminated end and the constellation.

8. The optical fiber according to claim 1, wherein the optical fiber satisfies the first configuration and in the first configuration, and a separation distance of the position of the constellation from the cladding center is defined by a shortest distance between an axis defining the symmetry of the constellation and the cladding center while the symmetry of the constellation is symmetry defined by only the line symmetry axis of one axis, and
wherein the separation distance is not less than 1 μm and less than a radius of the common cladding.

9. The optical fiber according to claim 1, wherein the optical fiber satisfies the second configuration, and the distinguishing marker includes at least one marker element arranged on an inner peripheral surface of the coating so as to indicate a specific direction on the circumference of the coating.

10. The optical fiber according to claim 9, wherein a mode of the distinguishing marker to indicate the specific direction is either one of a mode in which the distinguishing marker has a circumferential directionality.

11. The optical fiber according to claim 9, wherein a mode of the distinguishing marker to indicate the specific direction is a mode in which the distinguishing marker comprises two marker elements arranged at unopposed positions and making the two marker elements different from each other in at least one of color, shape, and arrangement position.

12. The optical fiber according to claim 1, wherein the optical fiber satisfies the second configuration, and the distinguishing marker includes at least one marker element arranged on an outer peripheral surface of the coating so as to indicate a specific direction on the circumference of the coating.

13. The optical fiber according to claim 12, wherein a mode of the distinguishing marker to indicate the specific direction is a mode in which the distinguishing marker has a circumferential directionality.

14. The optical fiber according to claim 12, wherein a mode of the distinguishing marker to indicate the specific direction is a mode in which the distinguishing marker comprises two marker elements arranged at unopposed positions and making the two marker elements different from each other in at least one of color, shape, and arrangement position.

* * * * *